United States Patent
Yamada

(10) Patent No.: US 9,680,826 B2
(45) Date of Patent: Jun. 13, 2017

(54) BIOMETRIC AUTHENTICATION METHOD, COMPUTER-READABLE RECORDING MEDIUM, AND BIOMETRIC AUTHENTICATION APPARATUS

(71) Applicant: FUJITSU LIMITED, Kawasaki-shi, Kanagawa (JP)

(72) Inventor: Shigefumi Yamada, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 58 days.

(21) Appl. No.: 14/937,987

(22) Filed: Nov. 11, 2015

(65) Prior Publication Data

US 2016/0149906 A1    May 26, 2016

(30) Foreign Application Priority Data

Nov. 25, 2014   (JP) ................. 2014-237967

(51) Int. Cl.
| | |
|---|---|
| *H04L 29/06* | (2006.01) |
| *G06K 9/46* | (2006.01) |
| *G06K 9/62* | (2006.01) |
| *G06F 17/30* | (2006.01) |
| *G06K 9/00* | (2006.01) |

(52) U.S. Cl.
CPC ...... *H04L 63/0861* (2013.01); *G06F 17/3053* (2013.01); *G06K 9/00885* (2013.01);
(Continued)

(58) Field of Classification Search
CPC ............ H04L 63/0861; G06F 17/3053; G06K 9/00885; G06K 9/46; G06K 9/6215; G06K 2009/00932; G06K 2009/00966
(Continued)

(56) References Cited

U.S. PATENT DOCUMENTS

| | | |
|---|---|---|
| 2002/0152034 A1 | 10/2002 | Kondo et al. |
| 2011/0200237 A1 | 8/2011 | Nakamura et al. |
| 2015/0310252 A1 | 10/2015 | Aoki |

FOREIGN PATENT DOCUMENTS

| | | |
|---|---|---|
| JP | 2003-030154 | 1/2003 |
| JP | 2005-215963 | 8/2005 |

(Continued)

OTHER PUBLICATIONS

Shahin, Mohamed, Ahmed Badawi, and Mohamed Kamel. "Biometric authentication using fast correlation of near infrared hand vein patterns." International journal of Biomedical sciences 2.3 (2007): 141-148.*

(Continued)

*Primary Examiner* — Amandeep Saini
(74) *Attorney, Agent, or Firm* — Fujitsu Patent Center

(57) ABSTRACT

A biometric authentication method is disclosed. Biometric information is acquired from a pair of portions at right and left of a body. Collation feature data are generated from the biometric information for right and left. Similarity feature data are generated for calculating a similarity between the biometric information for right and left. A similarity score between right and left is calculated by using the similarity feature data. The collation feature data for right and left and the similarity score are registered in a registration database. Collation scores for right and left are calculated by comparing the collation feature data in the registration database, and other collation feature data generated in an authentication. It is determined whether the authentication is successful, by using the collation scores, the similarity score in the registration database, and another similarity score generated in the authentication.

12 Claims, 9 Drawing Sheets

(52) U.S. Cl.
CPC ............. *G06K 9/46* (2013.01); *G06K 9/6215* (2013.01); *G06K 2009/00932* (2013.01); *G06K 2009/00966* (2013.01)

(58) Field of Classification Search
USPC ........................................................ 382/115
See application file for complete search history.

(56) References Cited

FOREIGN PATENT DOCUMENTS

| | | |
|---|---|---|
| JP | 2005-317049 | 11/2005 |
| WO | 2010-044250 | 4/2010 |

OTHER PUBLICATIONS

Shahin, Mohamed et al., "Biometric Authentication Using Fast Correlation of Near Infrared Hand Vein Patterns", International Journal of Biological, Biomolecular, Agricultural, Food and Biotechnological Engineering, vol. 2, No. 1, 2008, pp. 32-39, XP002755555, Retrieved from the Internet: URL:http://www.waset.org/publications/7380 [retrieved on Mar. 15, 2016].

Daugman, John et al., "Epigenetic randomness, complexity and singularity of human iris patterns", Proceedings—The Royal Society, Biological Sciences, vol. 268, No. 1477, Aug. 22, 2001, pp. 1737-1740, XP055258675.

Extended European Search Report dated Mar. 29, 2016 for corresponding European Patent Application No. 15194274.5, 6 pages.

\* cited by examiner

FIG.3

| ID | 6d | | 5d |
|---|---|---|---|
| | RIGHT HAND FEATURE | LEFT HAND FEATURE | SIMILARITY SCORE |
| 001 | COLLATION FEATURE DATA 1 | COLLATION FEATURE DATA 2 | 20 |
| 002 | COLLATION FEATURE DATA 3 | COLLATION FEATURE DATA 4 | 80 |
| 003 | COLLATION FEATURE DATA 5 | COLLATION FEATURE DATA 6 | 30 |
| ... | ... | ... | ... |
| | 6d_R | 6d_L | |

9 REGISTRATION DB

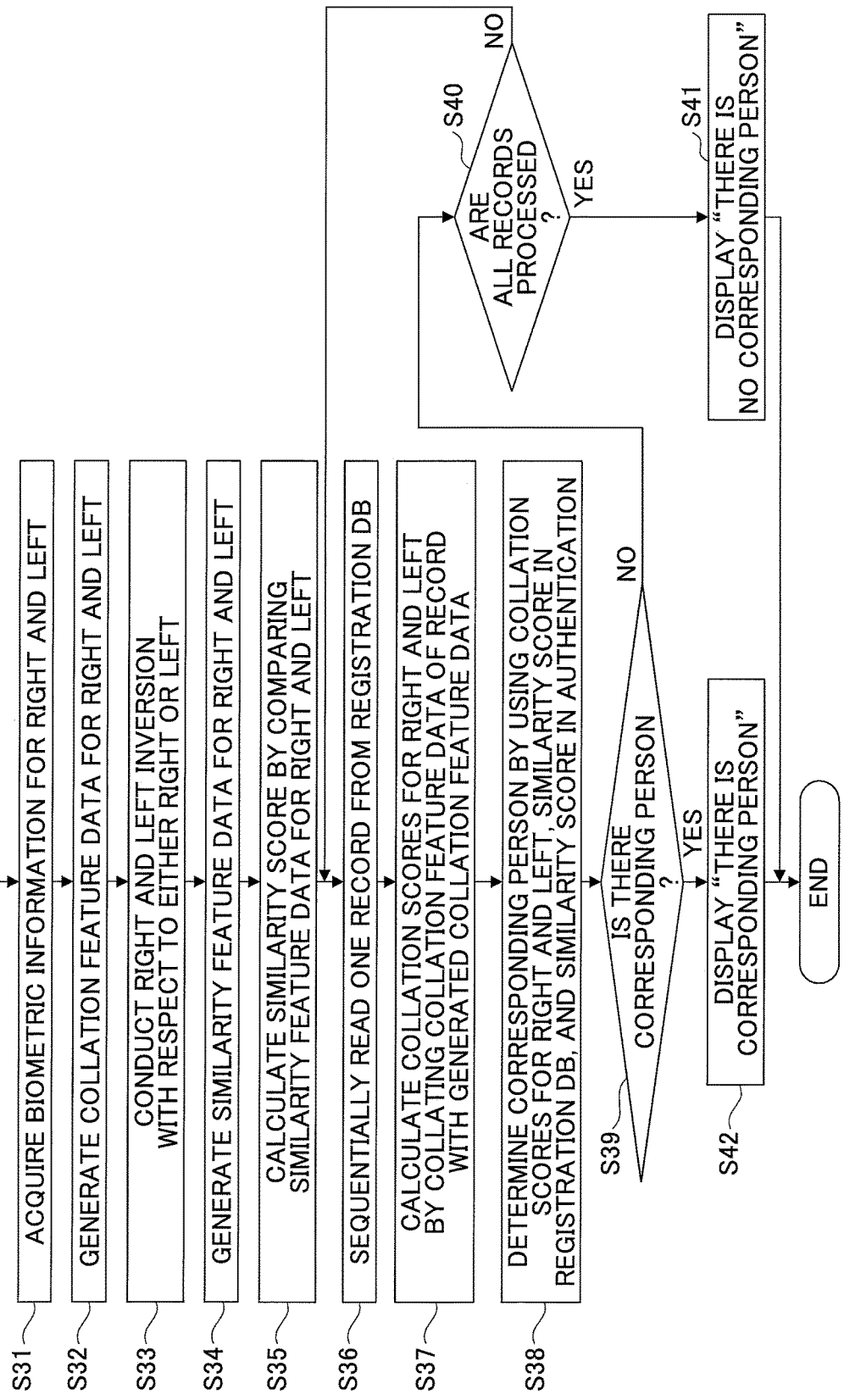

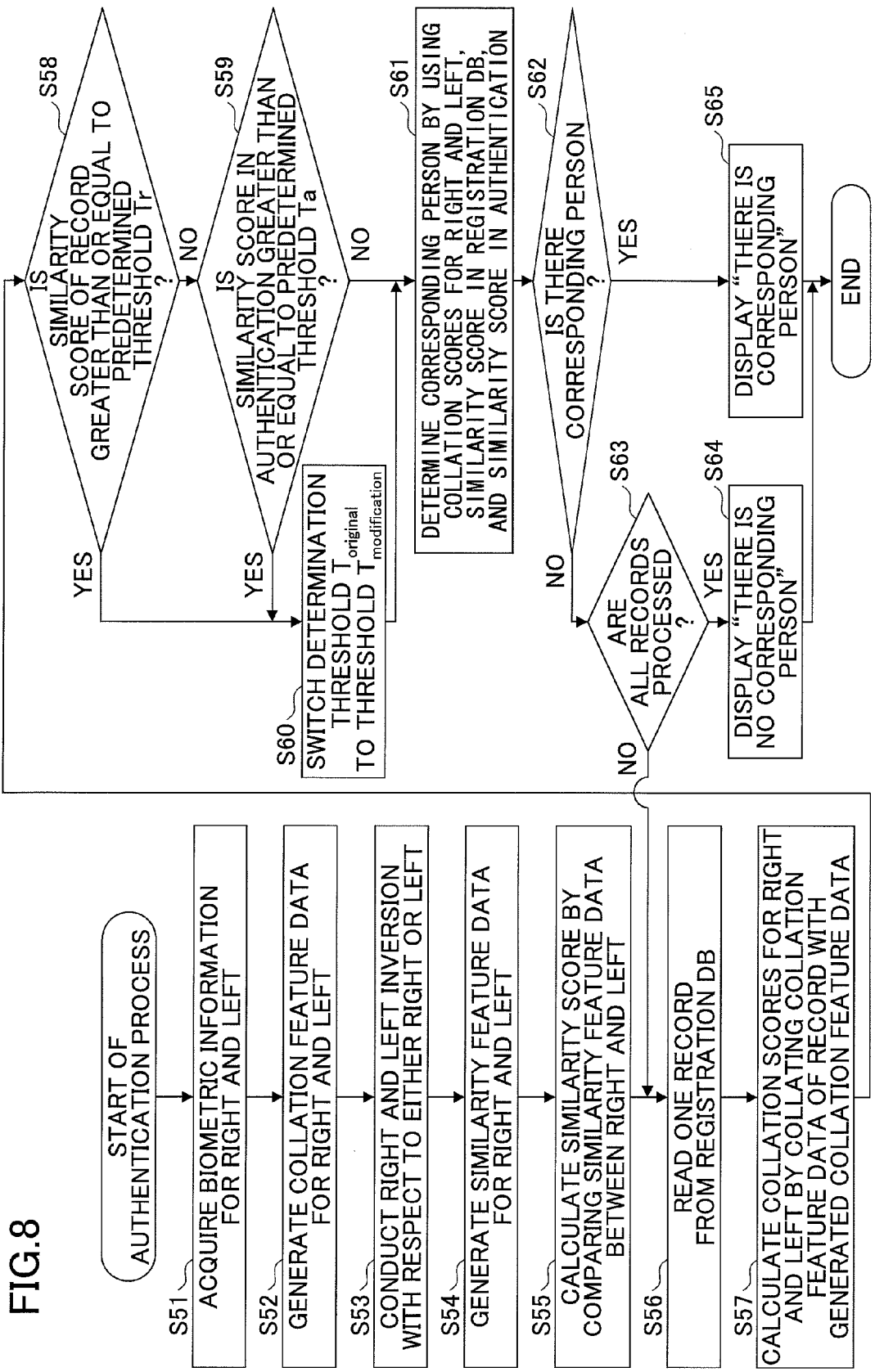

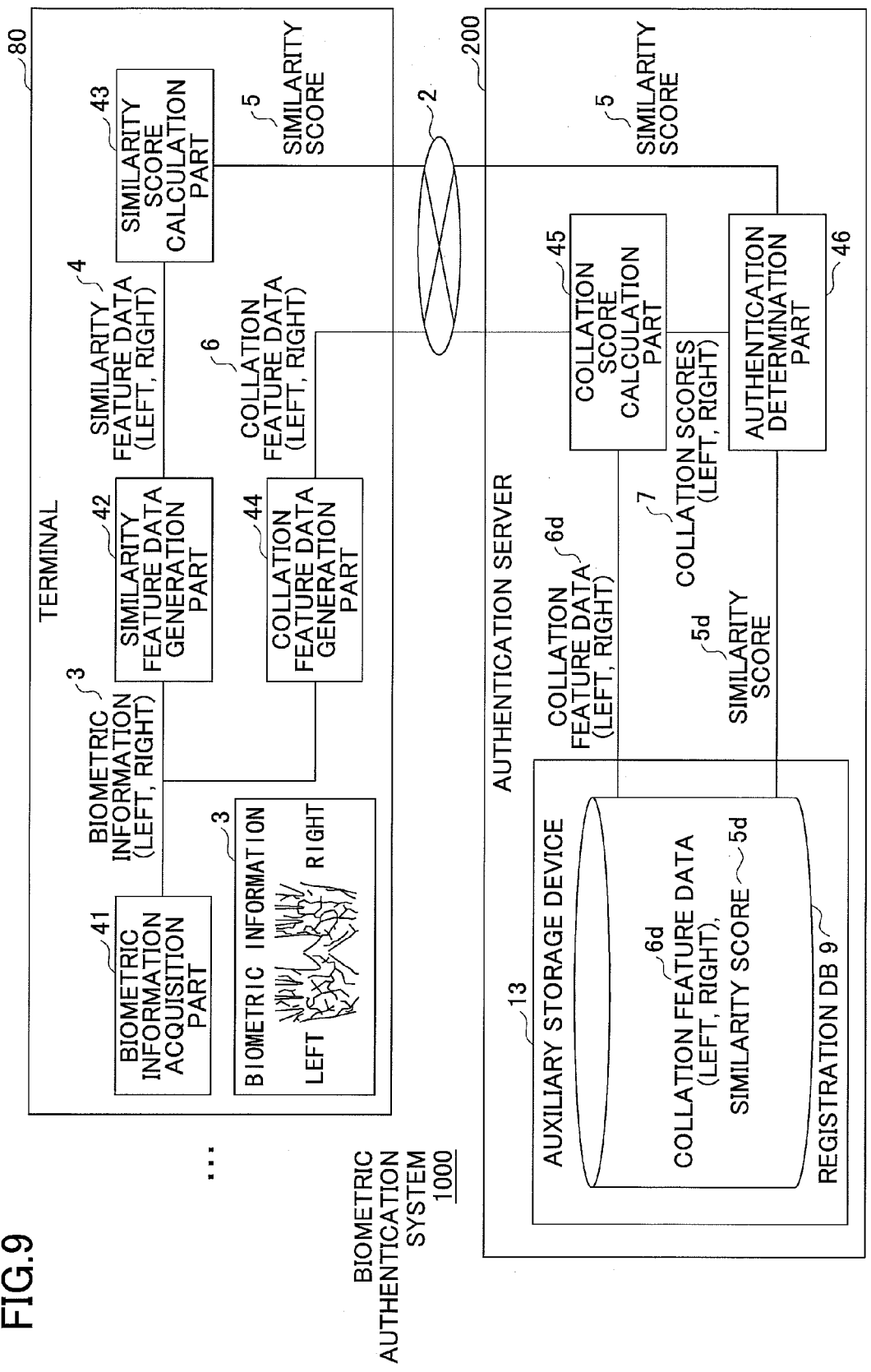

BIOMETRIC AUTHENTICATION METHOD, COMPUTER-READABLE RECORDING MEDIUM, AND BIOMETRIC AUTHENTICATION APPARATUS

CROSS-REFERENCE TO RELATED APPLICATIONS

This application is based upon and claims the benefit of priority of the prior Japanese Priority Application No. 2014-237967 filed on Nov. 25, 2014, the entire contents of which are hereby incorporated by reference.

FIELD

The embodiment discussed herein is related to a biometric authentication method, a computer-readable recording medium, and a biometric authentication apparatus.

BACKGROUND

Recently, a biometric authentication technology has started being applied to check registration overlapping to detect a person who has already been registered in a case of issuing national IDs, and to check a black list. In various usages, an extremely large amount of registrations such as tens of millions or hundreds of millions may be conducted depending on a country or a region. Hence, it is difficult to identify a person by an authentication technology using one type of biometric information. In this case, different persons may be erroneously determined as the same person.

In response to the large number of persons, a multi-biometric authentication technology using multiple sets of the biometric information may be used. In the multi-biometric authentication technology, it is important to know how to combine respective authentication results of the multiple sets of the biometric information. Thus, there are many applicable technologies such as decision level fusion, score level fusion, and the like.

In a multi-biometric authentication technology combining different types of the sets of the biometric information such as a fingerprint, an iris, a face, a palm print, handwriting, and the like, a user may select two or more sets of the biometric information to input. Authentication precision (determination threshold of collation) may be determined based on that combination.

Also, the multi-biometric authentication technology, which combines multiple sets of the biometric information of irises of both eyes, fingerprints, and the like for a person, is especially called "multi-instance". In this multi-instance authentication technology, a sensor for acquiring one type of the biometric information is used. This technology has been notable since the multi-biometric authentication technology is inexpensively installed without an additional sensor.

PATENT DOCUMENTS

Japanese Laid-open Patent Publication No. 2005-317049
Japanese Laid-open Patent Publication No. 2003-30154
Japanese Laid-open Patent Publication No. 2005-215963
International Publication Pamphlet No. WO 2010/044250

SUMMARY

According to one aspect of the embodiment, there is provided a biometric authentication method including acquiring, by a computer, sets of biometric information for right and left from a pair of portions at right and left of a body; generating, by the computer, sets of collation feature data to use for a collation from the sets of the biometric information for right and left; generating, by the computer, sets of similarity feature data to use for calculating a similarity between the sets of the biometric information for right and left from the sets of the biometric information for right and left; calculating, by the computer, a similarity score representing the similarity between the sets of the biometric information for right and left by comparing the generated sets of the similarity feature data for right and left with each other; registering, by the computer, the sets of the collation feature data for right and left and the similarity score by associating with each other in a registration database; calculating, by the computer, collation scores for right and left respectively by comparing the sets of the collation feature data registered in the registration database, and other sets of the collation feature data for right and left generated from other sets of the biometric information for right and left in an authentication; and determining, by the computer, whether the authentication is successful, by using the collation scores for right and left, the similarity score in the registration database, and another similarity score acquired by comparing other sets of the similarity feature data for right and left generated from other sets of the biometric information acquired in the authentication.

According to other aspects of the embodiment, a computer-readable recording medium, and a biometric authentication apparatus may be provided.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 3 is a diagram illustrating a data configuration example of a registration DB;

FIG. 7 is a flowchart for explaining an example of the authentication process;

FIG. 8 is a flowchart for explaining another example of the authentication process; and FIG. 9 is a diagram illustrating a configuration example of a biometric authentication system.

DESCRIPTION OF EMBODIMENTS

Figure 1:
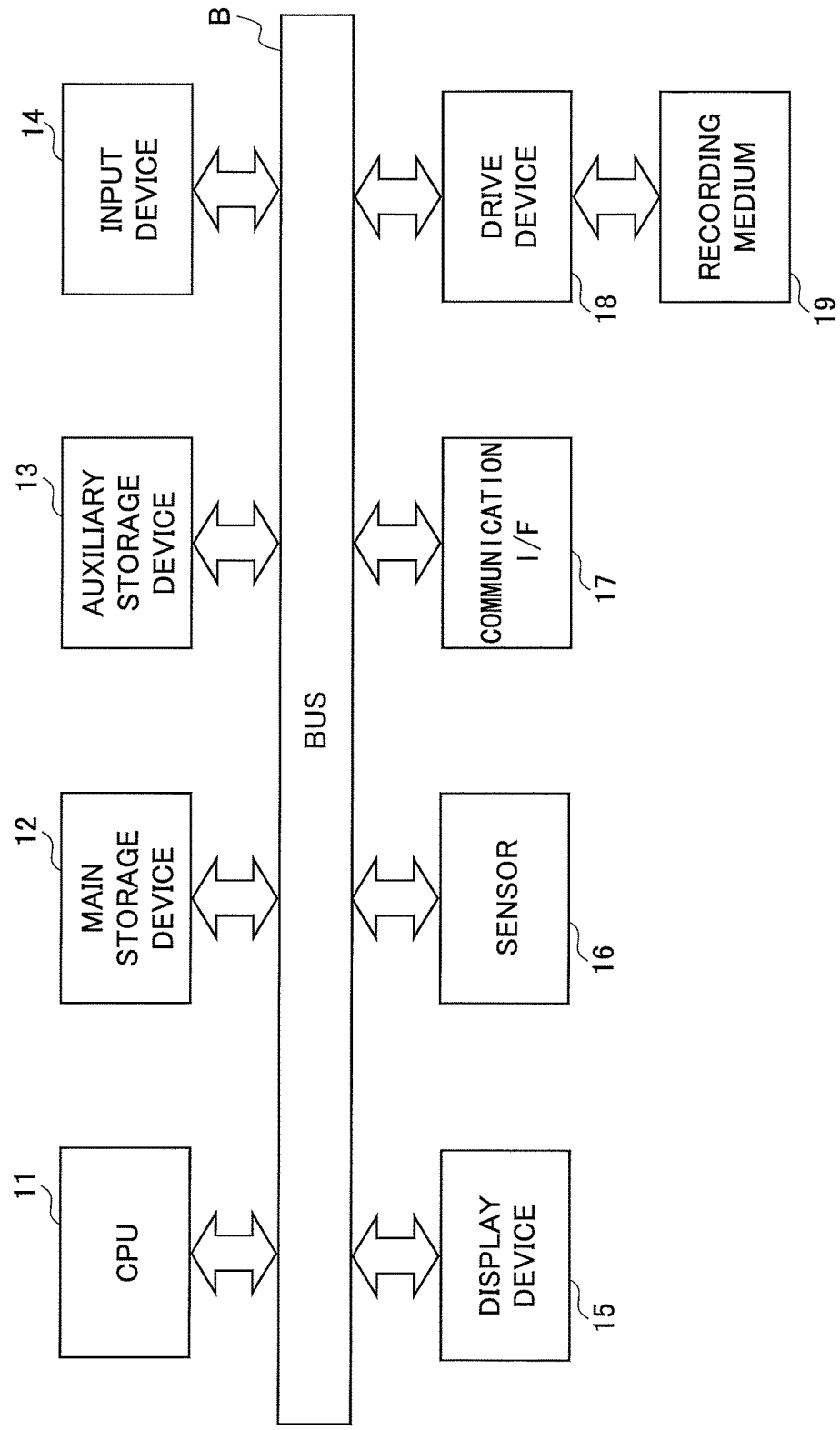
FIG. 1 is a diagram illustrating a hardware configuration of a biometric authentication apparatus.

In the related art, different types of the sets of the biometric information are acquired by using multiple sensors depending on them. Accordingly, there is a problem regarding costs of the multiple sensors.

A multi-instance authentication technology precisely identifies a person in a case of collating one set of the biometric information specified by identification information of a person A to be authenticated with another set of the biometric information input by the person A to verify his or her identity (one to one collation).

However, in a case of an authentication using sets of the biometric information for both hands, the above described technologies do not consider symmetry for right and left hands. Accordingly, in a case in which the person A is not sufficiently identified by a collation using the biometric information of a right hand, even if the biometric information of a left hand is added to be collated, the biometric information of the left hand of a person B as another person whose biometric information of right hand is similar to the biometric information of the right hand of the person A, may be similar to the biometric information of the left hand of the person A. There is a case in which it is difficult to distinguish between the person A and the person B.

As described above, in a case of suppressing registering the biometric information of the same person among a large amount of the biometric information (one to N collation), there is a problem in which the person A different from the person B is not registered. Also, in a case in which there is the biometric information of another person which corresponds to the biometric information input by the person A (one to one collation) and to which a certain matter is applied, the person A may be authenticated as another person different from the person A, and the matter which is irrelevant to the person A is applied.

In one aspect of an embodiment, accuracy of an authentication using the biometric information related to a symmetric region is improved.

In the following, the embodiment will be described with reference to the accompanying drawings. First, as an example of the biometric authentication in which a large number of people are subjects and a one to N collation may occur, each individual is authenticated by the biometric information.

In the multi-instance authentication technology using the same type of the biometric information, since a dependence of some kind generally exists in the biometric information used for the authentication, the dependence influences a combination result. That is, in a case of using different types of the biometric information, it is difficult to simply combine sets of the biometric information of multiple regions such as a case of using different types of the biometric information.

A case of introducing the multi-bio metric authentication technology using sets of palm vein information of both hands will be described as an example. The palm vein information exhibits infinite varieties of patterns. Even in a case of the same person, the palm vein information generally exhibits different patterns.

However, if shapes and sizes of both hands are similar to each other, regions (regions of interest) where a vein pattern exists in both hands are similar to each other due to bilaterally symmetric right and left hands. A similarity based on a result from comparing sets of the palm vein information of both hands tends to be higher than a case of comparing with the palm vein information of a hand of another person at least.

The similarity between the right and left hands varies depending on persons. The similarity further varies depending on shapes of hands at the time the palm vein information is input. Due to the similarity between both hands, in a case of collating both hands of different persons, if the similarity between one hand (for instance, right hand) of one person and that of another person is higher, the similarity between another hand (for instance, left hand) of one person and that of the other person tends to be higher.

In the embodiment, the following case will be described in the biometric authentication using the sets of the palm vein information of bilateral symmetric right and left hands. In an example of the case, the person A is registered in which the biometric information of the right hand and the biometric information of the left hand of the person A are similar to each other due to bilateral symmetry, when the right hand and the left hand are joined.

When it is determined that the biometric information of the right hand of the person A is similar to that of the right hand of the person B who has been registered, the similarity is determined between the biometric information of the left hand of the person A and that of the left hand of the person B. Also, in a case of the person B, similar to the person A, the biometric information of the right hand may be similar to that of the left hand due to bilateral symmetry.

In this case, the person A who has not been registered yet is not registered. Although the person A is different from the person B, the person A is not registered. The person A is manually checked and confirmed as a different person from the person B.

As another example, the following case is considered. In this case, at an immigration examination for preventing an entry of a criminal, a person P, whose the sets of the biometric information are similar to each other due to the bilateral symmetric right and left hands, is examined. If the biometric information of the right hand of the person P is similar to that of the right hand of a criminal in which the biometric information of the right hand of the criminal is registered, that of the left hand of the person P may be similar to that of the left hand of the criminal.

In this case, an immigration inspector confirms the person P as a different person from the criminal who is registered, based on physical features and the like of nationality, skin, eyes, and the like.

As described above, even if combining the sets of the palm vein information of the right and left hands, an amount of information useful for the authentication is not simply increased depending on the sets of the palm vein information. That is, the amount of the information useful for the authentication does not become double as a case of one hand, even if the sets of the palm vein information of the right and left hands are combined.

In a biometric authentication apparatus 100 according to the embodiment, for the biometric authentication using the sets of the palm vein information of the right and left hands, in a case of considering the similarity between the palm vein information of the right hand and that of the left hand and collating persons having high similarity, a personal authentication is conducted at strict accuracy.

FIG. 1 is a diagram illustrating a hardware configuration of a biometric authentication apparatus 100. In FIG. 1, the biometric authentication apparatus 100 is a terminal controlled by a computer, and includes a Central Processing Unit (CPU) 11, a main storage device 12, an auxiliary storage device 13, an input storage device 14, a display device 15, a sensor 16, a communication InterFace (I/F) 17, and a drive device 18, which are mutually connected to each other via a bus B.

The CPU 11 corresponds to a processor, and controls the biometric authentication apparatus 100 in accordance with a program stored in the main storage device 12. A Random Access Memory (RAM), a Read Only Memory (ROM), and the like may be used as the main storage device 12. The main storage device 12 stores or temporarily retains the program to be executed by the CPU 11, data for a process conducted by the CPU 11, data acquired in the process conducted by the CPU 11, and the like.

A Hard Disk Drive (HDD) or the like may be used as the auxiliary storage device 13. The auxiliary storage device 13 stores data such as the program to conduct various processes and the like. A part of the program being stored in the auxiliary storage device 13 is loaded into the main storage device 12, and is executed by the CPU 11, so that the various processes are realized.

The input device 14 includes a mouse, a keyboard, and the like. The input device 14 is used for an administrator of the authentication to input various information items for the process which is conducted in the biometric authentication apparatus 100. The display device 15 displays the various information items under control of the CPU 11.

The sensor 16 is regarded as a reader that reads palm veins. The sensor 16 includes a light emission part that emits near infrared light to a palm, and a light reception part that receives the near infrared light reflected on the palm, and reads palm veins. If the sensor 16 includes a Universal Serial Bus (USB) and is a detachable non-contact type, the sensor 16 further improves user-friendliness. Both hands may be held to the sensor 16, or the right hand and the left hand may be successively held in order.

The communication I/F 17 conducts communications via a network such as wired or wireless communications. The communications by the communication I/F 17 are not limited to the wired or wireless communications.

The program realizing the process, which is conducted by the biometric authentication apparatus 100, is provided to the biometric authentication apparatus 100 via a recording medium 19 such as a Compact Disc Read-Only Memory (CD-ROM) or the like. The recording medium 19 may be formed by a non-transitory (or tangible) computer-readable recording medium.

The drive device 18 interfaces between the recording medium 19 (which may be the CD-ROM or the like) set to the drive device 18 and the biometric authentication apparatus 100.

The program, which realizes various processes according to the embodiment described below, is stored in the recording medium 19. The program being stored in the recording medium 19 is installed into the biometric authentication apparatus 100 through the drive device 18. The installed program is executable in the biometric authentication apparatus 100.

It is noted that the recording medium 19 for storing the programs is not limited to the CD-ROM, and any types of computer-readable recording media may be used. As the computer-readable recording medium, a Digital Versatile Disk (DVD), a portable recording medium such as a Universal Serial Bus (USB) memory, or a semiconductor memory such as a flash memory may be used.

Figure 2:
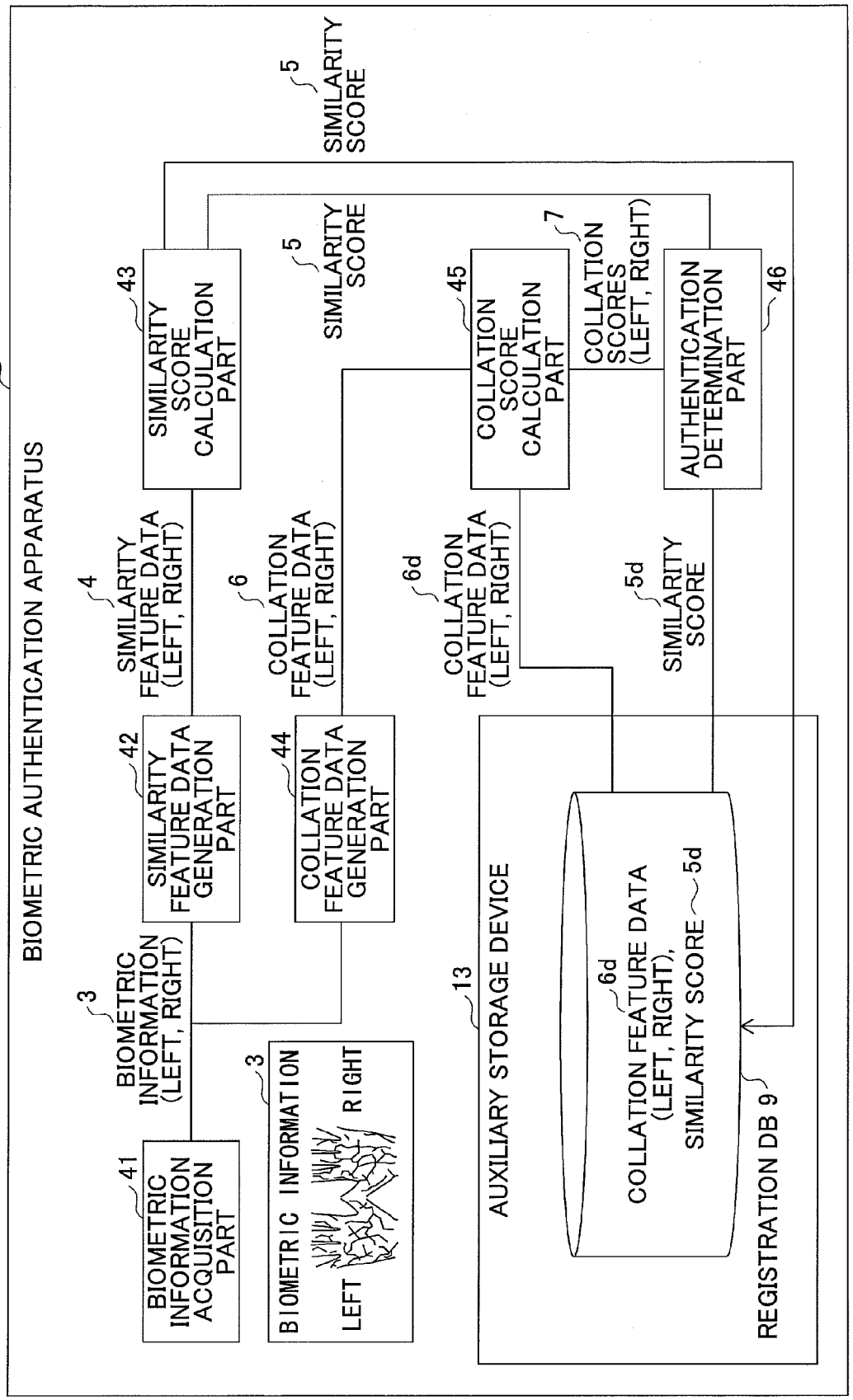
FIG. 2 is a diagram illustrating a functional configuration example of the biometric authentication apparatus.

FIG. 2 is a diagram illustrating a functional configuration example of the biometric authentication apparatus 100. The biometric authentication apparatus 100 includes a biometric information acquisition part 41, a similarity feature data generation part 42, a similarity score calculation part 43, a collation feature data generation part 44, a collation score calculation part 45, and an authentication determination part 46. The biometric information acquisition part 41, the similarity feature data generation part 42, the similarity score calculation part 43, the collation feature data generation part 44, the collation score calculation part 45, and the authentication determination part 46 are realized by the CPU 11 executing respective programs. Also, the auxiliary storage device 13 stores a registration DB 9 and the like.

The biometric information acquisition part 41 creates a vein image depicting vein portions read from a near infrared image which is created by reading the palm by the sensor 16, and converts the vein image into a digital image so as to acquire biometric information 3. The biometric information acquisition part 41 sends the sets of the biometric information 3 of right and left palms acquired from the sensor 16 to the similarity feature data generation part 42 and the collation feature data generation part 44.

The similarity feature data generation part 42 generates sets of similarity feature data 4 by reversing either one of the right and left palms from the sets of the biometric information 3 of the right and left palms, which are received from the biometric information acquisition part 41, in order to acquire the similarity of the right and left palms. In the following, the right and left palms are simply called right and left. The right palm is called right, and the left palm is called left.

The similarity feature data generation part 42 may generate the biometric information 3 for right by reversing the biometric information 3 for left. In this case, the sets of the similarity feature data 4 for right and left are represented by the biometric information 3 originally for right and the biometric information 3 reversed for right. Alternatively, the similarity feature data generation part 42 may generate the biometric information 3 for left by reversing the biometric information 3 for right. In this case, the sets of the similarity feature data 4 for right and left are represented by the biometric information 3 reversed for left and the biometric information 3 originally for left.

The similarity feature data generation part 42 sends the generated sets of the similarity feature data 4 to the similarity score calculation part 43.

The similarity score calculation part 43 calculates a similarity score by comparing and collating the sets of the similarity feature data 4. If original sets of the biometric information 3 for right and left are collated, the original sets of the biometric information 3 do not correspond to each other as themselves. Due to the bilateral symmetry of body parts, the biometric information 3 for right is reversed to right and left. The sets of the biometric information 3 for right and left are collated, and it is determined whether the sets of the biometric information 3 are similar to each other.

In a case of representing a similarity score 5 by a similarity degree, the higher the similarity score 5 is, the more similar the right and left hands are. On the other hand, when the similarity score 5 is represented by a difference degree (distance), the lower the similarity score 5 is, the more similar are the right and left hands. In the following, the similarity degree is used for the similarity score 5.

In a case of a registration, the similarity score 5 is registered in the registration DB 9 in the auxiliary storage device 13. In the following, the similarity score 5 after the registration is called a similarity score 5d. During the authentication, the similarity score 5 acquired in the authentication is compared with the similarity score 5d of the registration DB 9. The similarity calculation part 43 sends the similarity score 5 to the authentication determination part 46.

The collation feature data generation part 44 generates sets of collation feature data 6 used for a collation score calculation from the sets of the biometric information 3 for right and left. In the case of the registration, the sets of the collation feature data 6 for right and left are registered in the registration DB 9 in the auxiliary storage device 13. In the following, the collation feature data 6 after the registration is called collation data 6*d*.

Also, during the authentication, the sets of the collation feature data 6 for right and left are compared with the sets of the collation feature data 6*d* for right and left in the registration DB 9, respectively. The collation feature data generation part 44 sends the sets of the collation feature data 6 for right and left to the collation score calculation part 45.

The collation score calculation part 45 compares and collates the sets of the collation feature data 6 generated during the authentication with the sets of the collation feature data 6*d* for right and left stored beforehand in the registration DB 9. The collation score calculation part 45 calculates a collation score 7 for each of the right and left palms. As the collation score 7, the similarity degree or the difference degree may be used similar to the similarity score 5. In the following, the similarity degree is applied for the collation score 7.

A collation process, in which the sets of the collation feature data 6 for right and left which are generated during the authentication are collated with the sets of the collation feature data 6*d* being registered, depends on the biometric information 3 to be used. An existing technology may be used for the collation process of the right and left palms. Basically, processes in the embodiment do not depend on the collation process. Hence, the explanation thereof will be omitted.

The authentication determination part 46 determines whether the authentication is successful by using four scores: two collation scores for right and left calculated by the collation score calculation part 45, the similarity score 5*d* being registered, and the similarity score 5 calculated during the authentication.

If the similarity score 5 calculated in the authentication is high, this case indicates that both the right and left palms are similar to each other. If one palm is similar to that of another person, both right palms and left palms tend to be similar. Therefore, the person A to be authenticated is likely to be detected as the person B. That is, a False Acceptance Rate (FAR) is higher.

The authentication determination part 46 determines the authentication by adjusting the collation between the similarity scores 5 and 5*d* in a negative direction (authentication denial). By this adjustment, even in a case of the collation of the right and left palms, a final collation determination is strictly performed, so that the FAR is reduced.

The biometric information 3 is regarded as information in which the sensor 16 illuminates the near infrared light to the palms and acquires a near infrared light image by receiving the near infrared light reflected on the palms, and the biometric information acquisition part 41 creates a vein image by reading veins and converts the vein image into a digital image.

The sets of the similarity feature data 4 are regarded as data which the similarity feature data generation part 42 generates based on the sets of the biometric information 3 for right and left. In a case in which the similarity feature data 4 for right is acquired from the biometric information 3 of the right palm, the similarity feature data 4 for left is acquired from the biometric information 3 of the left palm.

The similarity score 5 indicates the similarity degree between the sets of the biometric information 3 for right and left (that is, a right vein image and a left vein image) which are calculated by using the sets of the similarity feature data 4 for right and left. The closer to 1 the similarity score 5 is, the more similar the sets of the vein images are to each other. The closer to 0 the similarity score 5 is, the sets of the vein images are further different from each other. The similarity score 5*d* indicates a score registered in the registration DB 9.

The sets of the collation feature data 9 for right and left indicate data of feature portions to be collated based on the sets of the biometric information 3 for right and left. The sets of the collation feature data 6*d* for right and left indicate data being registered in the registration DB 9.

The collation score 7 is regarded as a score indicating the similarity degree between the sets of the collation feature data 6 based on the sets of the biometric information 3 input for the authentication, and the sets of the collation feature data 6*d* being registered in the registration DB 9

The similarity score 5 and the collation score 7 may be calculated by separate operation processing, or may be calculated by the same operation processing.

FIG. 3 is a diagram illustrating a data configuration example of the registration DB 9. In FIG. 3, the registration DB 9 is regarded as a database that maintains the sets of the collation feature data 6*d* for right and left and the similarity score 5*d* for each person, and includes items of "ID", "RIGHT HAND FEATURE", "LEFT HAND FEATURE", "SIMILARITY SCORE", and the like. The registration DB 9 may be retained in the biometric authentication apparatus 100, or may be maintained in a database server capable of a secure communication.

The item "ID" indicates identification information that specifies each person. Only one ID is given to each person.

The item "RIGHT HAND FEATURE" indicates collation feature data 6*d*_R of the right palm in the collation feature data 6*d* for right and left. The item "LEFT HAND FEATURE" indicates collation feature data 6*d*_L of the left palm in the collation feature data 6*d* for right and left. The item "RIGHT HAND FEATURE" and the item "LEFT HAND FEATURE" may indicate a storage location where the collation feature data 6*d*_R and the collation feature data 6*d*_L, instead of respective entities of the collation feature data 6*d*_R and the collation feature data 6*d*_L. The storage location may indicate an address, Uniform Resource Locator (URL), and the like.

The item "SIMILARITY SCORE" indicates the similarity score 5*d* calculated by the similarity score calculation part 43 in the registration.

Figure 4:
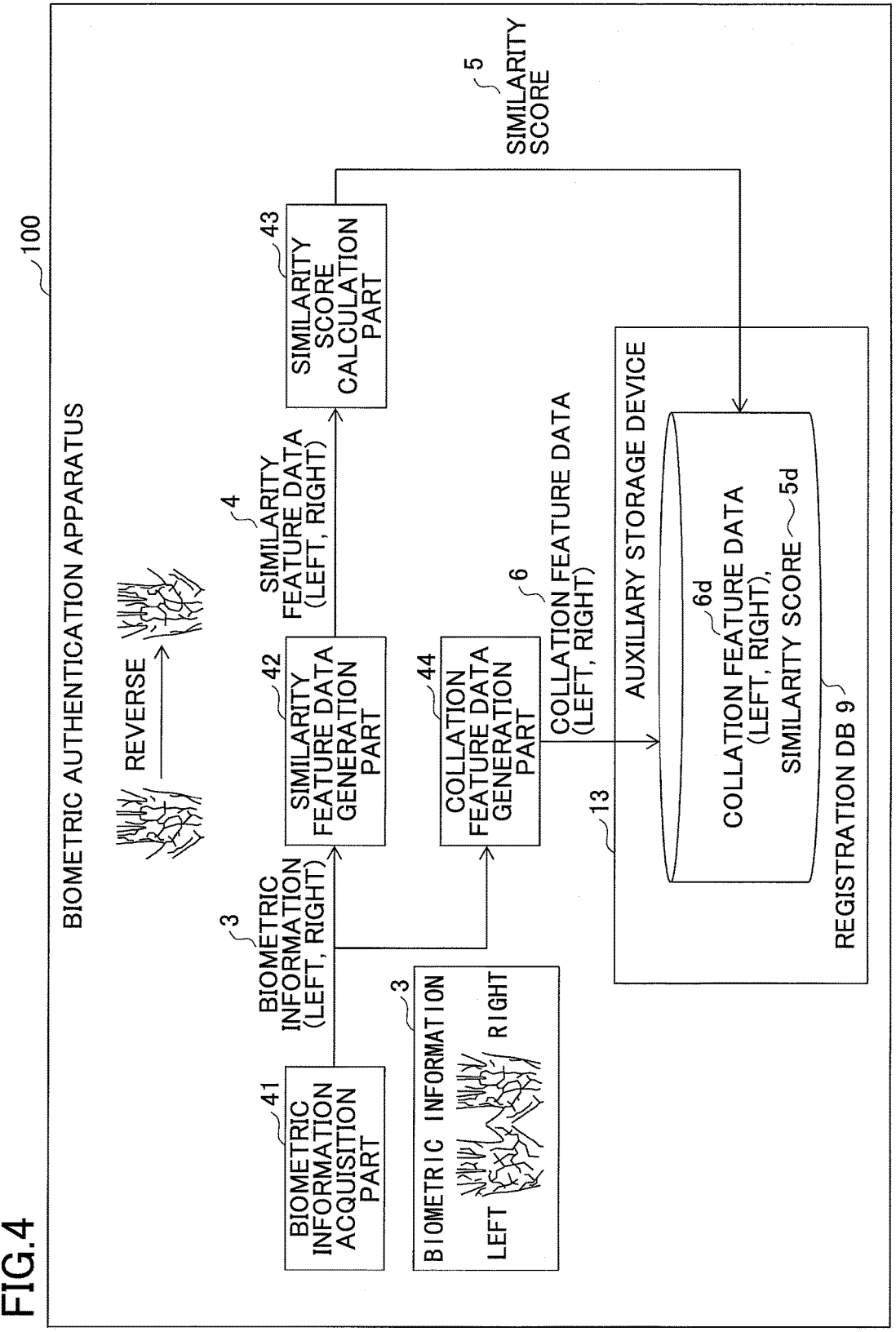
FIG. 4 is a diagram illustrating a functional configuration example pertinent to a registration process in the functional configuration illustrated in FIG. 2.
Figure 5:
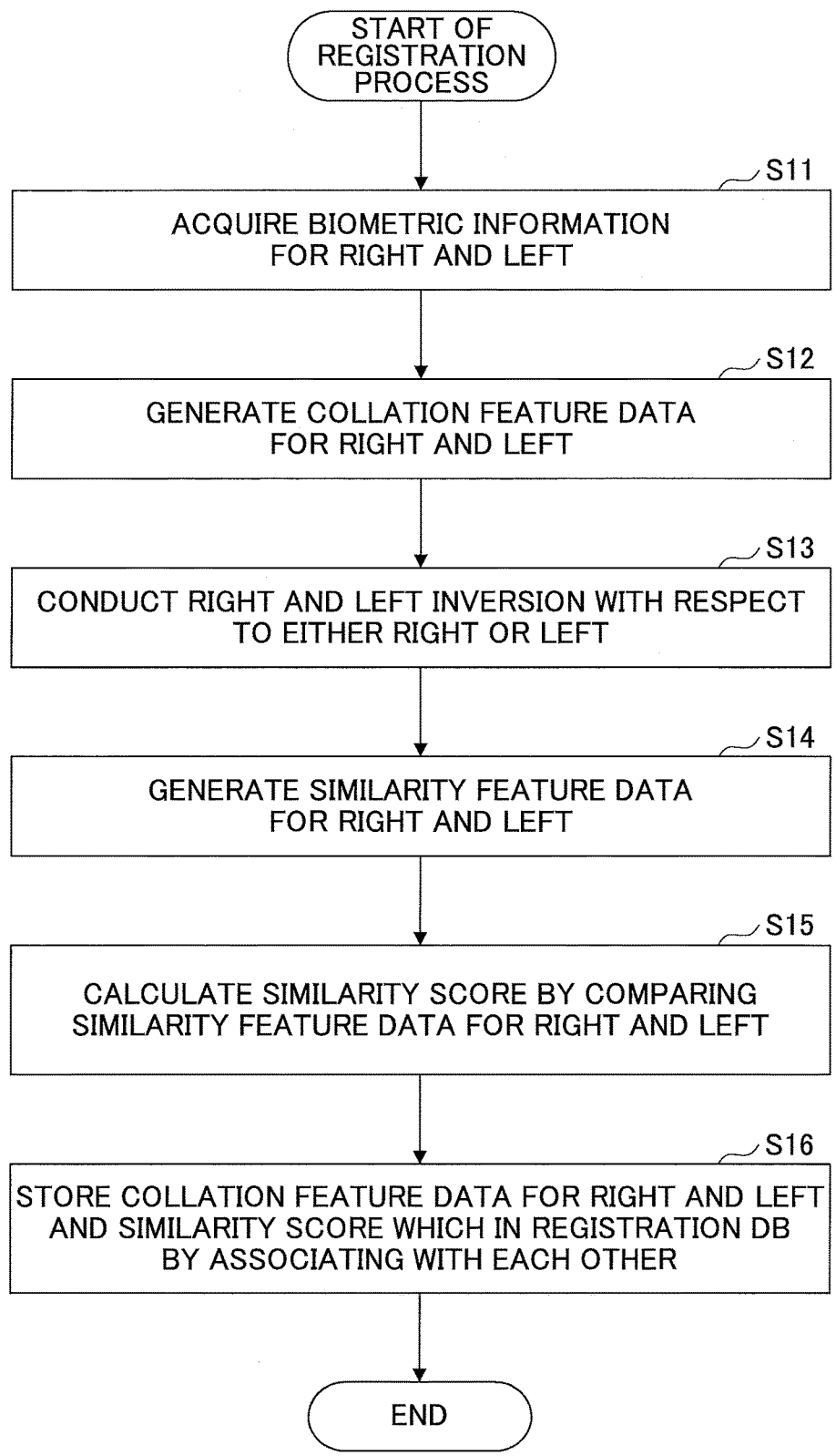
FIG. 5 is a flowchart for explaining the registration process.

Next, a registration process will be described. FIG. 4 is a diagram illustrating a functional configuration example pertinent to the registration process in the functional configuration illustrated in FIG. 2. FIG. 5 is a flowchart for explaining the registration process.

FIG. 4 illustrates a biometric information acquisition part 41, a similarity feature data generation part 42, a similarity score calculation part 43, and a collation feature data generation part 44 for the registration process. Referring to FIG. 4, the registration process will be described in accordance with the flowchart in FIG. 5.

In FIG. 5, the biometric information acquisition part 41 digitalizes the sets of the palm vein information of the right and left hands which is read by the sensor 16, and acquires the sets of the biometric information 3 for right and left (step S11).

The collation feature data generation part 44 generates the sets of the collation feature data 6 for right and left to be used to calculate the collation scores 7, based on the sets of the biometric information 3 for right and left (step S12).

The similarity feature data generation part 42 reverses either one of the sets of the biometric information 3 for right and left which are acquired by the biometric information acquisition part 41 (step S13), and generates the sets of the similarity feature data 4 for right and left (step S14).

The similarity score calculation part 43 calculates the similarity score 5 by comparing the sets of the similarity feature data 4 for right and left with each other (step S15). Then, the similarity score calculation part 43 stores the sets of the collation feature data 6 for right and left, and the similarity score 5 in the registration DB 9 by associating with each other (step S16). After the registration, the sets of the collation feature data 6 and the similarity score 5 are referred to as the sets of the collation feature data 6d and the similarity score 5d.

When a process by the similarity score calculation part 43 ends, the registration process by the biometric authentication apparatus 100 is terminated.

In the above described registration process, a process in step S12 by the collation feature data generation part 44 may be performed after step S15 and before step S16.

Figure 6:
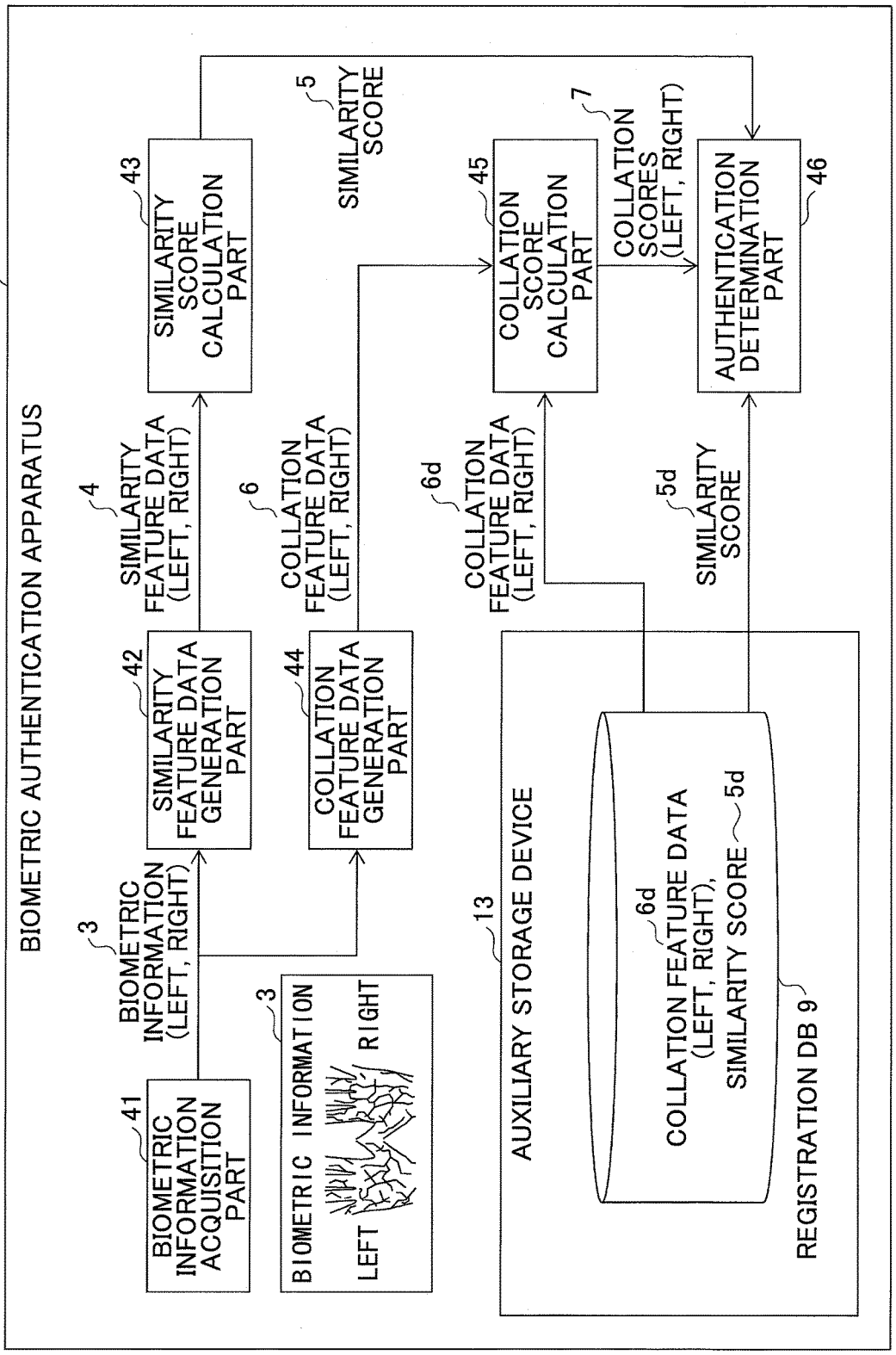
FIG. 6 is a diagram illustrating a functional configuration example pertinent to an authentication process in the functional configuration illustrated in FIG. 2.

Next, FIG. 6 is a diagram illustrating a functional configuration example pertinent to an authentication process in the functional configuration illustrated in FIG. 2. FIG. 7 is a flowchart for explaining an example of the authentication process.

FIG. 6 illustrates the biometric information acquisition part 41, the similarity feature data generation part 42, the similarity score calculation part 43, the collation feature data generation part 44, the collation score calculation part 45, and the authentication determination part 46, regarding the authentication process. Referring to FIG. 6, the registration process will be described in accordance with the flowchart in FIG. 7.

In FIG. 7, the biometric information acquisition part 41 digitalizes the sets of the palm vein information of the right and left hands which is read by the sensor 16, and acquires the sets of the biometric information 3 for right and left (step S31).

The collation feature data generation part 44 generates the sets of the collation feature data 6 for right and left to be used to calculate the collation scores 7, based on the sets of the biometric information 3 for right and left (step S32).

The similarity feature data generation part 42 laterally reverses either one of the sets of the biometric information 3 for right and left which are acquired by the biometric information acquisition part 41 (step S33), and generates the sets of the similarity feature data 4 for right and left (step S34).

The similarity score calculation part 43 calculates the similarity score 5 by comparing the sets of the similarity feature data 4 for right and left (step S35).

Next, the collation score calculation part 45 subsequently reads one record from the registration DB 9 (step S36), and calculates the collation scores 7 by collating the sets of the collation feature data 6d of the read record with the sets of the collation feature data 6 (step S37).

After that, the authentication determination part 46 determines the person by using the sets of the collation scores 7, the similarity score 5 of the registration DB 9, and the similarity score 5 in the authentication (step S38). A fusion score, which will be described later, may be used in a determination method. The authentication determination part 46 determines whether a determination result indicates that there is a corresponding person (step S39). When the authentication is successful, it is determined that there is the corresponding person.

When an authentication determination result indicates that there is the corresponding person, the authentication determination part 46 determines whether the collation ends for all records of the registration DB 9 (step S40).

When the authentication has failed, it is determined that there is no corresponding person. When the collation ends for all records, the authentication determination part 46 goes back to step S36 and repeats the above described process with respect to a next record. When all records are collated, "there is no corresponding person" is displayed at the display device (step S40). After that, the biometric authentication apparatus 100 terminates the authentication process.

On the other hand, in step S39, when the authentication determination result indicates that there is the corresponding person, the authentication determination part 46 displays "there is a corresponding person" at the display device 15 (step S42). After that, the biometric authentication apparatus 100 terminates the authentication process.

In the above, a process in step S32 by the collation feature data generation part 44 may be performed after step S35 and before step S36.

An authentication determination process by the authentication determination part 46 will be described. As a first method, there is a method that calculates a fusion score by a fusion method of a score level and determines the corresponding person. The fusion score may be defined by linearly combining the sets of the collation scores 7 respective to right and left, the similarity score 5d registered in the registration DB 9, and the similarity score 5 calculated in the authentication.

The following expression (1) may be used. In the expression (1), a minus weight a is added to a total of the similarity score 5d in the registration and the similarity score 5 in the authentication.

$$S_{fusion}=S_{right}+S_{left}-\alpha(S_{enroll}+S_{input}) \quad (1)$$

In the above expression (1), $S_{fusion}$ indicates the fusion score, $S_{right}$ indicates the collation score 7 for the right palm, $S_{left}$ indicates the collation score 7 for the left palm, $S_{enroll}$ indicates the similarity score 5d registered in the registration DB 9, and $S_{input}$ indicates the similarity score 5 registered in the authentication.

When there are the sets of the collation feature data 6d for right and left in the registration DB 9, which correspond to the sets of the collation feature data 6 in the authentication, "$(S_{enroll}+S_{input})$" in the expression (1) becomes zero or a value closer to zero. Accordingly, there is less influence due to the minus weight α.

When there are the sets of the collation feature data 6d for right and left in the registration DB 9 which are similar to the sets of the collation feature data 6 for right and left in the authentication, the authentication is conducted by using the minus weight a to consider the similarity score 5d and the similarity score 5. That is, the authentication is strictly performed. Accordingly, it is possible to reduce the False Acceptance Rate.

As a second method, the fusion score is defined by linearly combining multiple scores, and each of weights $\alpha_1$, $\alpha_2$, $\alpha_3$, and $\alpha_4$ is determined by learning using experimental data. As a learning method, a well-known technology such as a Linear Discriminant Analysis (LDA), support vector machine (SVM), or the like may be used.

The second method is described as an expression (2):

$$S_{fusion}=\alpha_1 S_{right}+\alpha_2 S_{left}+\alpha_3 S_{enroll}+\alpha_4 S_{input} \quad (2).$$

Moreover, as a third method, in a case of an AND combination of the fusion method of a determination level, a total of the similarity score 5d in the registration and the similarity score 5d in the authentication is multiplied with a plus weight α, and a determination threshold $T_{original}$ is further added in order to determine success or failure of the authentication.

$$T_{modification} = T_{original} + \alpha(S_{enroll} + S_{input}) \quad (3)$$

In this expression (3), $T_{modification}$ indicates an adjusted threshold value, and $T_{original}$ indicates a determination threshold which is defined beforehand. $S_{enroll}$ and $S_{input}$ are described above.

Since the collation scores 7 for right and left indicate the similarity, if each of the collation scores 7 are greater than or equal to a predetermined threshold T, the authentication determination part 46 determines that the authentication is successful. On the other hand, if each of the collation scores 7 is less than the predetermined threshold T, the authentication determination part 46 determines that the authentication has failed. In the expression (3), $T_{modification}$ corresponds to the predetermined threshold T. The same threshold value may be applied as the $T_{original}$ for both palms. Alternatively, two different threshold values are applied as the $T_{original}$ for the right palm and the left palm, respectively.

The authentication determination part 46 calculates the fusion score $S_{fusion}$ by the first method or the second method. When the fusion score $S_{fusion}$ is greater than or equal to the determination threshold $T_{original}$, it is determined that the authentication is successful. Alternatively, when the threshold $T_{modification}$, in which the similarity scores 5*d* and 5 are considered with respect to the determination threshold $T_{original}$, is greater than or equal to the calculated fusion score $S_{fusion}$, the authentication determination part 46 may determined that the authentication is successful.

When the similarity score 5*d* or 5 is greater than or equal to a threshold $T_r$ or $T_a$, respectively, the above described determination threshold $T_{original}$ may be switched to a predetermined threshold $T_{modification}$. This case is described as another example of the authentication process.

FIG. 8 is a flowchart for explaining another example of the authentication process. In FIG. 8, the threshold $T_{modification}$ is a value defined beforehand so that the False Acceptance Rate is lowered. The biometric information acquisition part 41 digitalizes the sets of the palm vein information of both hands read by the sensor 16, and acquires the sets of the biometric information 3 for right and left (step S51).

The collation feature data generation part 44 generates the sets of the collation feature data 6 for right and left used to calculate respective collation scores 7 from the sets of the biometric information 3 for right and left (step S52).

The similarity feature data generation part 42 laterally reverses either one of the sets of the biometric information 3 for right and left acquired by the biometric information acquisition part 41 (step S53), and generates the sets of the similarity feature data 4 for right and left (step S54).

The similarity feature data generation part 42 calculates the similarity score 5 by comparing the sets of the similarity feature data 4 for right and left with each other (step S55).

Next, the collation score calculation part 45 sequentially reads one record from the registration DB 9 (step S56), and calculates the sets of the collation scores 7 for right and left by collating the sets of the collation feature data 6d read from the registration DB 9 and the sets of the collation feature data 6 calculated by the collation score calculation part 45 in the authentication (step S57).

After that, the authentication determination part 46 determines whether the similarity score 5*d* in the record is greater than or equal to a predetermined threshold Tr (step S58). That is, it is determined whether the sets of the collation feature data 6*d* for right and left in the registration are similar to each other. When the sets of the collation feature data 6*d* for right and left are similar to each other, the authentication determination part 46 switches the determination threshold $T_{original}$ to the threshold $T_{modification}$ (step S60), and advances to step S61. On the other hand, when the sets of the collation feature data 6*d* for right and left are not similar to each other, the authentication determination part 46 does not switch the determination threshold $T_{original}$ and advances to step S59.

When the sets of the collation feature data 6*d* for right and left are not similar to each other, the authentication determination part 46 further determines whether the similarity score 5 in the authentication is greater than or equal to the predetermined $T_a$ (step S59). It is determined whether the sets of the collation feature data 6*d* for right and left in the authentication are similar to each other. When the sets of the collation feature data 6*d* for right and left are similar to each other, the authentication determination part 46 switches the determination threshold $T_{original}$ (step S60), and advances to step S61. On the other hand, when the sets of the collation feature data 6*d* for right and left are not similar to each other, the authentication determination part 46 does not switch the determination threshold $T_{original}$, and advances to step S61.

After that, the authentication determination part 46 determines the corresponding person by using the sets of the collation scores 7 for right and left, the similarity score 5*d* in the registration DB 9, and similarity score 5 in the authentication (step S61). The fusion score $S_{fusion}$ may be used in the determination method. The authentication determination part 46 determines whether the determination result indicates that there is the corresponding person (step S62). When the authentication is successful, it is determined that there is the corresponding person.

When the authentication determination result indicates that there is no corresponding person, the authentication determination part 46 determines whether all records in the registration DB 9 are processed, that is, whether the collation is performed for all records in the registration DB (step S63).

When the authentication has failed, it is determined that there is no corresponding person. When the collation is not completed for all records in the registration DB 9, the authentication determination part 46 goes back to step S56 and repeats the above described process for a next record in the same manner. When all records are processed, that is, when the collation is completed for all records in the registration DB 9, the authentication determination part 46 displays "there is no corresponding person" at the display device 15 (step S64). After that, the biometric authentication apparatus 100 terminates the authentication process.

On the other hand, in step S62, when the authentication determination result indicates that there is the corresponding person, the authentication determination part 46 displays "there is the corresponding person" at the display device 15 (step S65). After that, the biometric authentication apparatus 100 terminates the authentication process.

The above described embodiment may be applied to a system that performs 1 to N collation in a large scale. As will be described in FIG. 9, in a biometric authentication system 1000 to which multiple terminals 80 and an authentication server 200 are connected via a network 2, the sets of the biometric information 3 for right and left, which are input from each of the multiple terminals 80, are collated with the registered sets of the biometric information 3 for right and left in the registration DB 9 for each person.

FIG. 9 is a diagram illustrating a configuration example of the biometric authentication system 1000. In FIG. 9, the multiple terminals 80 and the authentication server 200 are computer apparatuses, and includes a hardware configuration similar to that illustrated in FIG. 1. Thus, the explanation thereof will be omitted.

Each of the terminals 80 includes the biometric information acquisition part 41, the similarity feature data generation part 42, the similarity score calculation part 43, and the collation feature data generation part 44. The biometric information acquisition part 41, the similarity feature data generation part 42, the similarity score calculation part 43, and the collation feature data generation part 44 perform corresponding processes similar to those described above, and thus, the explanations thereof will be omitted.

In each of the multiple terminals 80, the similarity score 5 calculated by the similarity score calculation part 43 is sent to the authentication server 200 through the network 2. Also, the sets of the collation feature data 6 for right and left, which are generated by the collation feature data generation part 44, are sent to the authentication server 200 through the network 2.

The authentication server 200 includes the collation score calculation part 45, and the authentication determination part 46. The collation score calculation part 45, and the authentication determination part 46 perform corresponding processes similar to those described above, and thus, the explanations thereof will be omitted.

In the authentication server 200, the collation score calculation part 45 calculates the collation scores 7 for right and left by collating the sets of the collation feature data 6 for right and left received from each of the multiple terminals 80 through the network 2 with the sets of the collation feature data 6d for right and left in each of records of the registration DB 9.

The authentication determination part 46 conducts the authentication determination process.

In a case in which the biometric authentication system 1000 is a system to register a new person, by using the sets of the biometric information 3 for right and left which are input by an unregistered person at one of the multiple terminals 80, the one to N collation is performed to collate a new person with multiple registered persons in the registration DB 9.

In practice, when the new person does not correspond to any registered person, it is allowed to register the new person. When the new person corresponds to one of the registered person, it is suppressed to register the new person as determined that the new person is actually the registered person. In this case, by applying the embodiment, it is possible to reduce a registration omission due to an erroneous detection in which the new person is erroneously correlated to a different person who has already registered.

In a case in which the biometric authentication system 1000 is a system in which collates with the registered persons, by using the sets of the biometric information 3 for right and left which are input by a determination target person at one of the multiple terminals 80, the one to N collation is performed to collate the determination target person with multiple registered persons in the registration DB 9.

In this case, by applying the embodiment, it is possible to reduce an erroneous detection in which the determination target person is erroneously determined as one of the registered person.

As described above, in the embodiment, the authentication is strictly performed when there is the similarity between right and left hands. Even in a case of collating among two or more persons who have high similarity between the right and left hands based on the sets of the collation feature data 6, it is possible to distinguish among the two or more persons. In this case, it is possible to reduce the False Acceptance Rate.

That is, in the embodiment, the authentication is performed by four kinds of scores: the similarity score $5d$ in the registration and the similarity score 5 in the authentication, in addition to the sets of the biometric information 3 for right and left in the registration, the sets of the biometric information 3 for right and left in the authentication, and the collation scores 7 acquired by comparing among the sets of the collation feature data $6d$ and 6 for right and left, respectively. Accordingly, it is possible to suppress an increase of the False Acceptance Rate due to the similarity between the sets of the biometric information 3 for right and left of one person.

Moreover, in the embodiment, in the sets of the similarity feature data 4 for right and left, one set of the similarity feature data 4 is generated by reversing right and left of one set of the biometric information 3 for right and left. Hence, it is possible to accurately evaluate the similarity with respect to the sets of the biometric information 3 representing bilaterally symmetrical body portions such as palm veins of both hands, palm prints of both hands, auricles of ears, or the like.

Also, depending on the similarity score $5d$ in the registration and the similarity score 5 in the authentication, the determination threshold $T_{original}$ for the collation is changed to reduce the collation scores 7. Hence, it is possible to reduce the increase of the False Acceptance Rate due to the similarity between the sets of the biometric information 3 for right and left.

Furthermore, the fusion score $S_{fusion}$ is defined by linearly combining the collation scores 7 calculated respectively for right and left, the similarity score $5d$ registered in the registration DB 9, and the similarity score 5 in the authentication. Each of the weights $\alpha_1$, $\alpha_2$, $\alpha_3$, and $\alpha_4$ is determined by using the experimental data and a process by some kind of a machine learning, and the fusion score $S_{fusion}$ is calculated. It is possible to reduce the increase of the False Acceptance Rate due to the similarity between the sets of the biometric information 3 for right and left.

Moreover, the biometric information acquisition part 41 may sequentially acquire the sets of the biometric information 3 for right and left from the single sensor 16. Accordingly, by a simple hardware configuration, it is possible to reduce the increase of the False Acceptance Rate due to the similarity between the sets of the biometric information 3 for right and left.

Furthermore, it is possible to apply the embodiment to a palm vein authentication using the sets of the biometric information 3 acquired from both hands being bilaterally symmetric.

Also, it is possible to apply the embodiment to a palm print authentication using the sets of the biometric information 3 acquired from both hands being bilaterally symmetric.

Furthermore, it is possible to apply the embodiment to the biometric authentication system 1000 which conducts the one to N collation in the large scale for an overlapping registration check, a black list check, or the like.

In the embodiment, it is possible to improve accuracy of the authentication using the biometric information 3 pertinent to body portions being bilaterally symmetric.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A biometric authentication method comprising:
acquiring, by a computer, sets of biometric information for right and left from a pair of portions at right and left of a body;
generating, by the computer, sets of collation feature data to use for a collation from the sets of the biometric information for right and left;
generating, by the computer, sets of similarity feature data to use for calculating a similarity between the sets of the biometric information for right and left from the sets of the biometric information for right and left;
calculating, by the computer, a similarity score representing the similarity between the sets of the biometric information for right and left by comparing the generated sets of the similarity feature data for right and left with each other;
registering, by the computer, the sets of the collation feature data for right and left and the similarity score by associating with each other in a registration database;
calculating, by the computer, collation scores for right and left respectively by comparing the sets of the collation feature data registered in the registration database, and other sets of the collation feature data for right and left generated from other sets of the biometric information for right and left in an authentication; and
determining, by the computer, whether the authentication is successful, by using the collation scores for right and left, the similarity score in the registration database, and another similarity score acquired by comparing other sets of the similarity feature data for right and left generated from other sets of the biometric information acquired in the authentication.

2. The biometric authentication method as claimed in claim 1, wherein one of the sets of the biometric information for right and left acquired from the pair of portions at right and left of the body is reversed, so as to generate another one of the sets of the similarity feature data for right and left.

3. The biometric authentication method as claimed in claim 1, wherein in the generating the sets of the similarity feature data for right and left, a determination threshold to compare with the collation scores for right and left is adjusted depending on at least one of the similarity score in the registration database and the other similarity score in the authentication.

4. The biometric authentication method as claimed in claim 1, wherein in the determining whether the authentication is successful, at least one of the collation scores for right and left is decreased depending on a total of the similarity score in the registration database and the other similarity score in the authentication.

5. The biometric authentication method as claimed in claim 1, wherein in the determining whether the authentication is successful, a fusion score is defined and calculated by linearly combining the collation score for right and left, the similarity score in the registration database, and the other similarity score in the authentication, and is compared with a determination threshold.

6. The biometric authentication method as claimed in claim 5, wherein each of weights in a linear combination is determined by using experimental data and a process of machine learning.

7. The biometric authentication method as claimed in claim 1, wherein in the acquiring the sets of the biometric information for right and left, the sets of the biometric information for right and left are sequentially acquired from a sensor.

8. The biometric authentication method as claimed in claim 1, wherein the biometric information is palm vein information.

9. The biometric authentication method as claimed in claim 1, wherein the biometric information is palm print information.

10. The biometric authentication method as claimed in claim 1, wherein
in the calculating the collation scores for right and left, the collation scores for right and left are calculated by comparing the sets of the collation feature data for right and left registered in the registration database for each of multiple registered persons with the other sets of the collation feature data for right and left generated in the authentication, and
in the determining whether the authentication is successful, it is determined whether there is a corresponding person, by using four scores: the collation scores for right and left, the similarity score in the registration database, and the other similarity score in the authentication.

11. A non-transitory computer-readable recording medium that stores a biometric authentication program that causes a computer to execute a process comprising:
acquiring, by a computer, sets of biometric information for right and left from a pair of portions at right and left of a body;
generating, by the computer, sets of collation feature data to use for a collation from the sets of the biometric information for right and left;
generating, by the computer, sets of similarity feature data to use for calculating a similarity between the sets of the biometric information for right and left from the sets of the biometric information for right and left;
calculating, by the computer, a similarity score representing the similarity between the sets of the biometric information for right and left by comparing the generated sets of the similarity feature data for right and left with each other;
registering, by the computer, the sets of the collation feature data for right and left and the similarity score by associating with each other in a registration database;
calculating, by the computer, collation scores for right and left respectively by comparing the sets of the collation feature data registered in the registration database, and other sets of the collation feature data for right and left generated from other sets of the biometric information for right and left in an authentication; and
determining, by the computer, whether the authentication is successful, by using the collation scores for right and left, the similarity score in the registration database, and another similarity score acquired by comparing other sets of the similarity feature data for right and left generated from other sets of the biometric information acquired in the authentication.

12. A biometric authentication apparatus comprising:
a storage part that includes a registration database; and
a processor that executes a process including
- acquiring sets of biometric information for right and left from a pair of portions at right and left of a body;
- generating sets of collation feature data to use for a collation from the sets of the biometric information for right and left;
- generating sets of similarity feature data to use for calculating a similarity between the sets of the biometric information for right and left from the sets of the biometric information for right and left;
- calculating a similarity score representing the similarity between the sets of the biometric information for right and left by comparing the generated sets of the similarity feature data for right and left with each other;
- registering the sets of the collation feature data for right and left and the similarity score by associating with each other in the registration database;
- calculating collation scores for right and left respectively by comparing the sets of the collation feature data registered in the registration database, and other sets of the collation feature data for right and left generated from other sets of the biometric information for right and left in an authentication; and
- determining whether the authentication is successful, by using the collation scores for right and left, the similarity score in the registration database, and another similarity score acquired by comparing other sets of the similarity feature data for right and left generated from other sets of the biometric information acquired in the authentication.

* * * * *